United States Patent
Kircheis

(10) Patent No.: US 11,511,708 B2
(45) Date of Patent: Nov. 29, 2022

(54) VEHICLE TREATMENT SYSTEM HAVING A SIGNALLING DEVICE, AND METHOD FOR DETERMINING AND DISPLAYING ENTRY INFORMATION

(71) Applicant: WashTec Holding GmbH, Augsburg (DE)

(72) Inventor: Richard Kircheis, Augsburg (DE)

(73) Assignee: WashTec Holding GmbH, Augsburg (DE)

( * ) Notice: Subject to any disclaimer, the term of this patent is extended or adjusted under 35 U.S.C. 154(b) by 290 days.

(21) Appl. No.: 16/753,414

(22) PCT Filed: Sep. 25, 2018

(86) PCT No.: PCT/EP2018/075952
§ 371 (c)(1),
(2) Date: Apr. 3, 2020

(87) PCT Pub. No.: WO2019/068516
PCT Pub. Date: Apr. 11, 2019

(65) Prior Publication Data
US 2021/0370887 A1    Dec. 2, 2021

(30) Foreign Application Priority Data

Oct. 6, 2017    (DE) ...................... 10 2017 123 271.0

(51) Int. Cl.
*B60S 3/04*    (2006.01)
*G08G 1/095*    (2006.01)
(Continued)

(52) U.S. Cl.
CPC ............... *B60S 3/04* (2013.01); *G08G 1/052* (2013.01); *G08G 1/056* (2013.01); *G08G 1/095* (2013.01)

(58) Field of Classification Search
None
See application file for complete search history.

(56) References Cited

U.S. PATENT DOCUMENTS 3,528,119 A  *  9/1970  Fergerson ................. B60S 3/06
                                                     15/DIG. 2
5,090,429 A  *  2/1992  Barber ...................... B60S 3/04
                                                     134/123
(Continued)

FOREIGN PATENT DOCUMENTS

DE          29723828 U1     3/1999
DE       202012103410 U1    12/2013
(Continued)

OTHER PUBLICATIONS

German Search Report for German Application No. 10 2017 123 271.0, dated Jun. 29, 2018 (with English translation).

(Continued)

*Primary Examiner* — John F Mortell
(74) *Attorney, Agent, or Firm* — Christopher A. Rothe; Culhane Meadows, PLLC

(57) ABSTRACT

A vehicle treatment system includes a signalling device with at least one sensor and a signal generator. The sensor can continuously detect the position of the vehicle in a predetermined approach region in front of or in the vehicle treatment system. The signal generator can output a signal which changes continuously or discretely and corresponds to a continuously changing position of the vehicle. In this case, the signalling device has at least two lights arranged above one another. A corresponding method can be used for determining and displaying entry information.

9 Claims, 8 Drawing Sheets

(51) Int. Cl.
    *G08G 1/052*    (2006.01)
    *G08G 1/056*    (2006.01)

(56)          References Cited

U.S. PATENT DOCUMENTS 6,709,530  B1 *   3/2004   Dietsch .................. B60S 3/002
                                                         134/45
  2011/0043379 A1   2/2011   Auer
  2014/0223677 A1 * 8/2014   Livingston ................ B60S 3/04
                                                         15/93.1
  2016/0063591 A1 * 3/2016   Belanger .................. B08B 3/003
                                                         705/26.61

FOREIGN PATENT DOCUMENTS

DE         202013103562  U1    7/2014
  GB             2378798   A     2/2003

OTHER PUBLICATIONS

International Search Report Application No. PCT/EP2018/075952, dated Nov. 22, 2018.

\* cited by examiner

VEHICLE TREATMENT SYSTEM HAVING A SIGNALLING DEVICE, AND METHOD FOR DETERMINING AND DISPLAYING ENTRY INFORMATION

CROSS REFERENCE TO RELATED APPLICATIONS

This application is the United States national phase entry of International Application No. PCT/EP2018/075952, filed Sep. 25, 2018, which claims the benefit of priority of German Application No. 10 2017 123 271.0, filed Oct. 6, 2017. The contents of International Application No. PCT/EP2018/075952 and German Application No. 10 2017 123 271.0 are incorporated by reference herein in their entireties.

FIELD

The present invention relates to a signalling device, in particular to an entry signal light for a vehicle treatment system. Furthermore, the invention relates to a method for determining and displaying entry information.

BACKGROUND

State of the art are entry lights which display three states when a vehicle enters a vehicle washing system, and thus signal the driver that the vehicle has not yet reached, has reached and/or has passed beyond a particular position. The signal remains in one state until a different state has been reached. Between the invitation to enter (=advance) and the reaching of the stop position (=stop) the driver is not given any information concerning the progress of the entering process. This means that it is possible, depending on the driver's reaction time or the vehicle's stopping distance, to pass over a switch point (e.g. stop). In this situation the driver is signalled the backing of the vehicle (=back). This process takes time, though. Some drivers will therefore enter the vehicle washing system with too much caution, which will also cause delays.

SUMMARY

It is therefore an object of the present invention to provide means and ways for achieving quicker service of a vehicle to be treated in a vehicle treatment system.

A vehicle treatment system in accordance with the invention comprises a signalling device with at least one sensor and a signal generator.

The at least one sensor can detect a positon of a vehicle approaching the vehicle treatment system. Different measurement methods may be applied for determining the position of the approaching vehicle. Thus, ultrasound, radar, laser, optical methods, sonic logging, triangulation methods or the like may be used. On principle, electromagnetic waves may be directed on the vehicle approaching the vehicle treatment system, and the positon of the vehicle can be deduced from reflected waves.

On the basis of the position detected by the sensor the signal generator can give a driver instructions for the correct driving behaviour. "Correct driving behavior" means that the driver places the vehicle on a predetermined position or in a predetermined placement region. "Instruction for the correct driving behavior" means above all that the driver is informed whether he/she has placed the vehicle on the predetermined position or in the predetermined placement region.

The at least one sensor can, in a predetermined approach region in front of or in the vehicle treatment system, detect the position of the vehicle continuously, and the signal generator comprises at least two lights arranged above one another.

The vehicle treatment system in accordance with the invention is characterized in that the signal generator can output a signal which changes continuously or discretely in correspondence with a continuously changing position of the vehicle.

In other words, the sensor measures the relative distance of the vehicle relative to the predetermined placement region, and the signal generator outputs different active signals in correspondence with different relative distances. At least as soon as the vehicle is in the predetermined approach region does the signal generator output a (first) signal. As soon as the vehicle is moving within the predetermined approach region and/or as soon as the vehicle has performed a certain minimal change of position prior to reaching the predetermined placement region, the signal output by the signal generator will change and/or it will output a different (second) signal.

The advantage of the signal generator in accordance with the invention is that the driver, when approaching the predetermined placement region, does not only obtain information about the changing position of the vehicle relative to the predetermined placement region in a timely manner, but that he/she, due to the speed of the changing signal, may also deduce the relative speed of the vehicle. By means of this information the driver is enabled to place the vehicle without hesitation and hence in a time-efficient manner in the predetermined placement region.

Whether the signal is continuous or discrete depends on the type of the signal means used. If, for instance, a dimmable light is used, a continuous display of the relative distance of the vehicle is possible. If, however, a plurality of lights are used which can be switched on and off merely individually or in combination, only a discrete display is possible. Due to digital data processing it has to be taken into account that even embodiments which are referred to as operating continuously in this context are only implemented to operate quasi-continuously. Decisive for the differentiation between "discrete" and "continuous" is in the scope of this invention whether a driver perceives the transition between two different signals as fluent or as abrupt. It is irrelevant whether the signal is an optical and/or an acoustic signal.

In accordance with one aspect of the invention the speed to be driven by the vehicle may be displayed to the driver by the frequency of the signals generated.

Communicating the change of the relative distance between the vehicle and the predetermined placement region by means of the frequency of the signals generated may be of advantage with respect to the space requirement and the manufacturing costs since only one means for generating two different signals will be necessary then.

In accordance with one aspect of the invention the signal generator may comprise at least one light of a first kind and at least one light of a second kind, wherein the at least one light of the first kind may generate a signal for advancing and the at least one light of the second kind a signal for backing.

The lights of the first kind may differ from the lights of the second kind with respect to shape, colour and/or position. Likewise, the lights of the first and second kinds may be designed with several colours, e.g. green/red. In particular, the lights of the first and second kinds may each have several colours and may, for instance, be designed as RGB lights which may assume individual colour and/or brightness values. The colours used may orientate themselves at colours of generally known light signs (e.g. traffic lights, i.e. "green" means "drive", "orange" means "attention", and "red" means "stop").

For instance, the lights of the second kind, which display the relative distance of the vehicle to the predetermined placement region during backing, may be positioned behind the vehicle, and the lights of the first kind, which display the relative distance of the vehicle to the predetermined placement region during advancing, may be positioned in front of the vehicle.

Different positions of the lights of the first and second kinds may accordingly lead to an ergonomically optimized system, which facilitates operation by the driver.

Such facilitation may also be achieved by appropriately selected, different colours and shapes of the lights of the first and second kinds. The lights may, for instance, have the shape of differently oriented arrows, or the lights of the first kind may be green and the lights of the second kind may be red.

In accordance with one aspect of the invention the signal generator may comprise at least three lights of the same kind which can generate at least one chaser light by switching on and off sequentially.

More precisely, the chaser light is generated in that in a first state a first light is switched on while a second light adjacent to the first light and a third light adjacent to the second light are switched off, in a second state the second light is switched on while the first light and the third light are switched off, and in a third state the third light is switched on while the first light and the second light are switched off.

It is also conceivable that not only individual lights arranged in series are switched on and off sequentially for generating a chaser light, but that groups of lights which are arranged side by side are switched on and off sequentially. Also dimmable lights may be used for generating the chaser light, which may give the movement of the chaser light a more fluent appearance.

Due to the simulated movement of a light source chaser lights are always paid increased attention to by people. Thus, by means of the chaser light it is possible to focus the driver on the signalling device, which in turn prevents him/her from unnecessarily wasting time due to other diversions.

In accordance with one aspect of the invention the direction to be driven and the speed of the vehicle can be displayed to the driver by means of the direction and the speed of the chaser light as a function of the position of the vehicle.

The direction of the chaser light corresponds to the direction of the simulated movement of the moving light source suggested by the chaser light.

The speed of the chaser light corresponds to the number of lights switched on and off sequentially per time.

In accordance with one aspect of the invention the direction to be driven and the speed of the vehicle may be displayed to the driver by means of the direction and the length of the chaser light as a function of the position of the vehicle.

The length of the chaser light corresponds to the number of switched-on lights which are arranged directly next to each other in a stationary period of the chaser light.

It is of advantage to display the direction to be driven and the speed of the vehicle to the driver by means of the direction, speed and/or length of the chaser light since this type of signalling comprises parallels to waving when a vehicle is directed by hand and is thus intuitively comprehensible for the driver.

According to one aspect of the invention the signal generator may comprise at least three lights of the same kind, and the direction to be driven and the speed of the vehicle may be displayed to the driver by means of a number of lights of the same kind which are switched actively directly next to each other, which number varies as a function of the position of the vehicle.

If the relative distance of the vehicle to the predetermined placement region is illustrated to the driver directly by means of a beam which is proportional to this relative distance and is in the form of switched-on lights positioned next to each other, the driver may be made aware of the distance at any time. This means that, even if the display is not updated any more due to a malfunction, i.e. the display freezes, the driver has, in the event of an immediate stopping, an idea as to where approximately the vehicle is positioned relative to the predetermined placement region.

In accordance with one aspect of the invention the signal generator may comprise at least one dimmable and/or colour-variable light.

The at least one dimmable light may upgrade the aesthetical appearance of the signal generator in an advantageous manner. Since a dimmable light can inherently output several kinds of signals, it is possible to implement the present invention by means of one single dimmable light. Even if a plurality of lights are provided, the at least one light can thus fulfil a fail-safe function in the event of a malfunction of the remaining lights.

If a colour-variable light such as, for instance, an RGB light is used when implementing the invention, the reaching of the stop region may be signalled to a driver by the flashing of the colour-variable light and/or lights in a first colour, for example red, whereas the position information in front of and behind the stop region may be displayed to the driver in a different colour and/or in different colours, for instance, in green and/or orange. Thus, by the use of a colour-variable light it is possible to resort to known colour codes from the safety system in a simple manner.

The invention also relates to a vehicle treatment system having a signalling device in accordance with one or a plurality of the above-mentioned aspects.

Specifically, the vehicle treatment system is a washing system for motor vehicles, preferably a portal washing system. Alternatively, the washing system may also be a washing tunnel, or the vehicle treatment system in accordance with the invention may be a different type of vehicle treatment system.

A method in accordance with the invention for determining and signalling entry information comprises the following steps
   signalling, preferably displaying, entry readiness of a vehicle treatment system for a vehicle, preferably by means of a signal generator in the form of a display;
   signalling, preferably displaying, a stop request, preferably by means of the signal generator, and
   detecting a distance between the vehicle treatment system and the vehicle, preferably by means of a sensor.

The method in accordance with the invention is characterized in that the signal corresponding to the detected distance is generated by means of a signal generator which comprises at least two lights arranged above one another.

BRIEF DESCRIPTION OF THE DRAWING FIGURES

The present invention is described in detail in the following by means of preferred embodiments with reference to the enclosed drawings, of which:

Equal or functionally equivalent features are provided with the same reference signs in the individual Figures.

DETAILED DESCRIPTION

Figure 1:
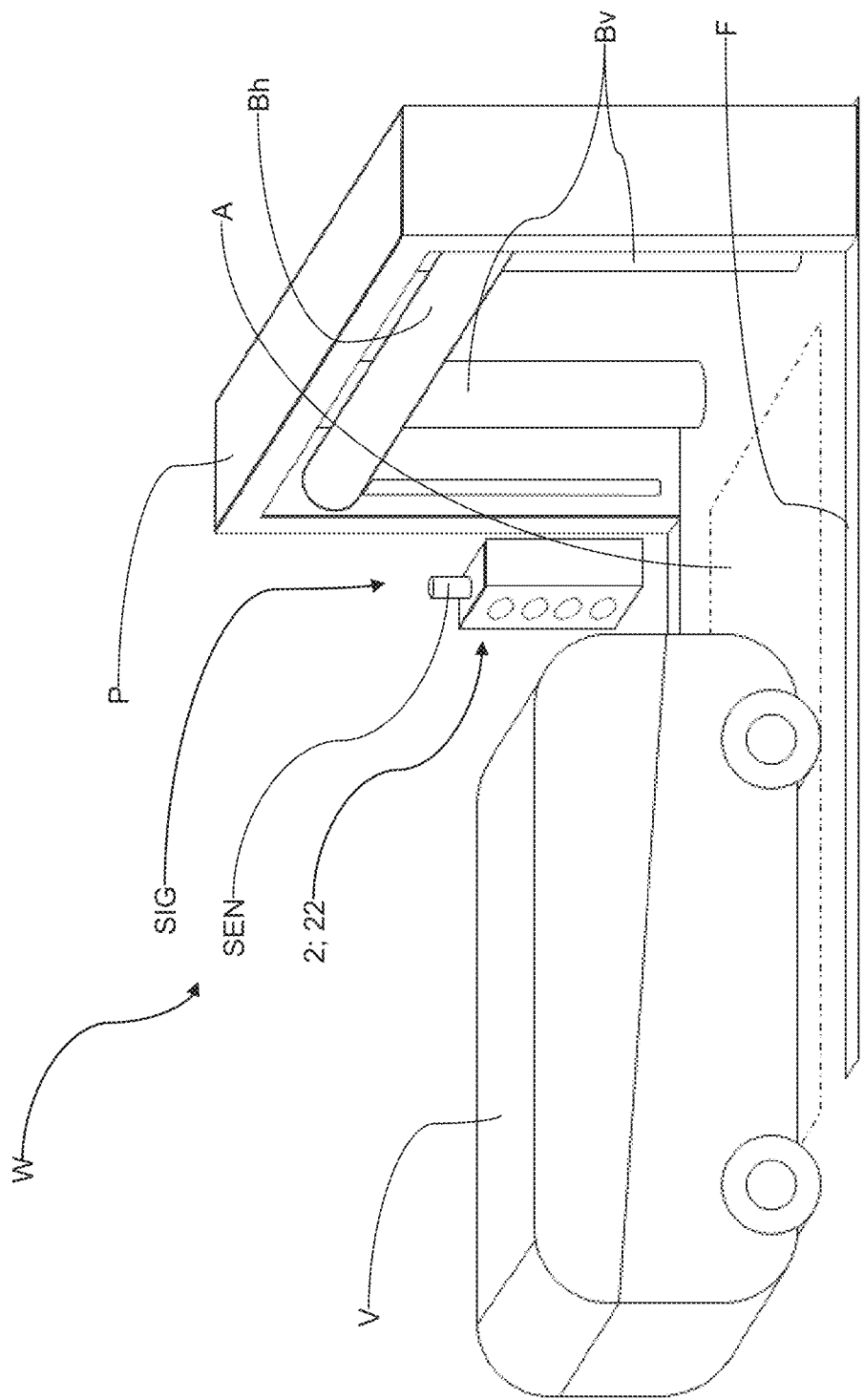
FIG. 1 is a schematic perspective view of a vehicle treatment system.

FIG. 1 shows a vehicle treatment system W in accordance with the invention. The vehicle treatment system W is designed in accordance with a washing portal construction and comprises accordingly a washing portal P which is translationally movable in guides F and which is equipped with a translationally vertically movable horizontal brush roller Bh and with two translationally horizontally movable vertical brush rollers By. Between the guides F of the vehicle treatment system W a predetermined placement region A is provided as a free space in which a vehicle V to be treated has to be placed so that it can be treated orderly, i.e. in the case of a vehicle washing system, can be washed. The vehicle treatment system W further comprises, at a distance from the predetermined placement region A, a signalling device SIG assisting the driver of the vehicle V during the orderly placement of the vehicle V within the predetermined placement region A.

Figure 2:
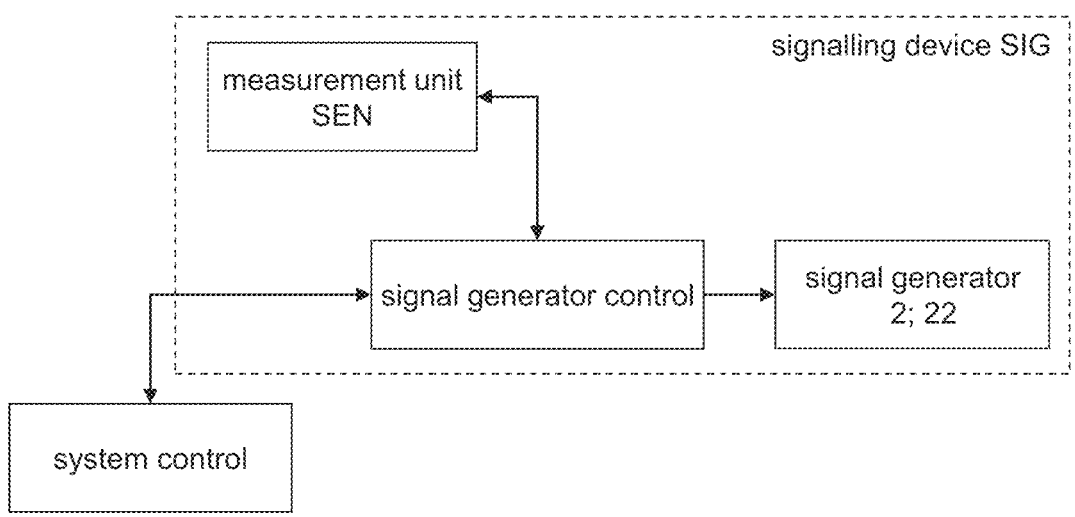
FIG. 2 is a schematic circuit diagram of a signalling device in accordance with the invention.

As is illustrated in FIG. 2, a signalling device SIG in accordance with the invention comprises a signal generator control which controls a signal generator 2; 22 by means of information of a measurement unit SEN. Once the vehicle V has been taken to the predetermined placement region A by means of the signalling device SIG, i.e. once a distance has been measured by the measurement unit SEN between the vehicle V and the predetermined placement region A which is equal to a predetermined nominal value (for instance, zero), the signal generator control outputs a signal to a system control which displays thereto the readiness of the vehicle V to be treated for a vehicle treatment.

The signalling device SIG may, as illustrated in FIG. 1, be designed separately from the washing portal P. Alternatively, it would also be possible to integrate it into the washing portal P at the side thereof facing the vehicle V. As is illustrated in FIG. 1, the signalling device SIG may comprise only one measurement unit SEN. Alternatively, it would also be possible to provide a plurality of measurement units. The signal generator 2; 22 and the measurement unit SEN may, as illustrated in FIG. 1, be positioned in relative close spatial vicinity to each other. Alternatively, it would also be possible to provide the measurement unit SEN at a position which is optimal for measuring the distance of the vehicle V to the predetermined placement region A, for instance, in the vicinity of the guides F, and the signal generator 2; 22 at a position which is optimal with respect to the field of view of the driver of the vehicle V, for instance, directly in front of the vehicle V.

Figure 3:
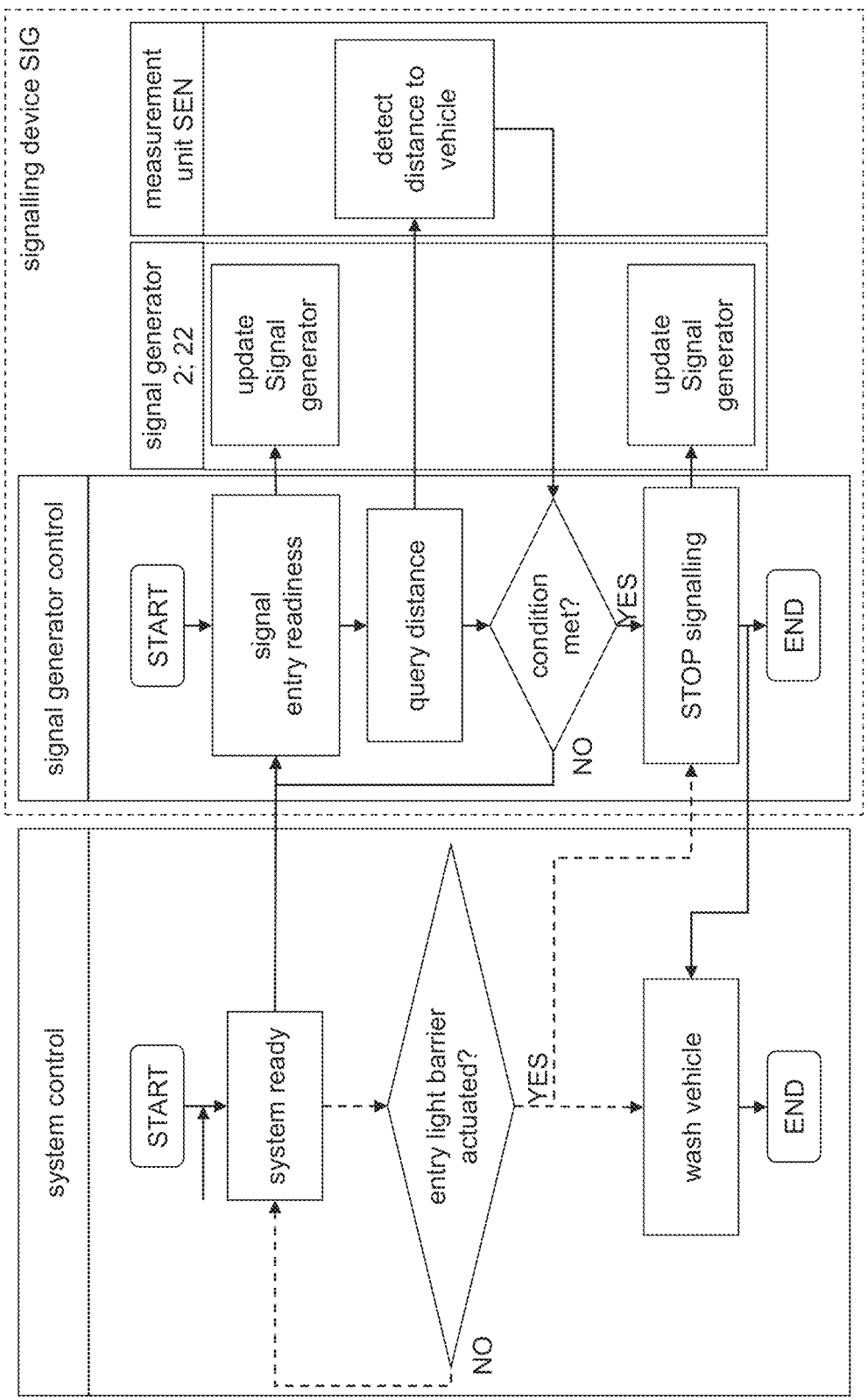
FIG. 3 is a flowchart of a method in accordance with the invention.

A flow chart illustrating the procedure during the control of the vehicle washing system W is shown in FIG. 3.

Once the system W is ready, the system control induces the signal generator control to signal the readiness of the system W for entering vehicles, the so-called entry readiness, by means of the signal generator 2; 22. The measuring unit SEN measures the distance between the entering vehicle V and the predetermined placement region A. The signal generator control examines whether the measured distance corresponds to a nominal value. If the measured distance does not correspond to the nominal value, the signal generator 2; 22 is induced by the signal generator control to output a signal updated in correspondence with the measured distance. This cycle is performed by the signalling device until the measured distance corresponds to the nominal value, i.e. the vehicle V is in the predetermined placement region A. If this is the case, the signal generator 2; 22 is induced to signal "STOP" to the driver and to thus request him/her to stop the vehicle V. If the vehicle V is positioned in the predetermined placement region A, the signal generator control and/or the signalling device outputs a corresponding signal to the system control which in turn causes the treatment of the vehicle V, in the case of a washing system, the washing.

The dashed lines illustrate in the flow chart of FIG. 3 the proceeding in accordance with the state of the art. Without giving the driver any feedback during entering the vehicle washing system W, a "STOP" signal is output by the signal generator only once a predetermined placement region has been reached. Updating of the signal generator during entering does not take place.

Figure 4:
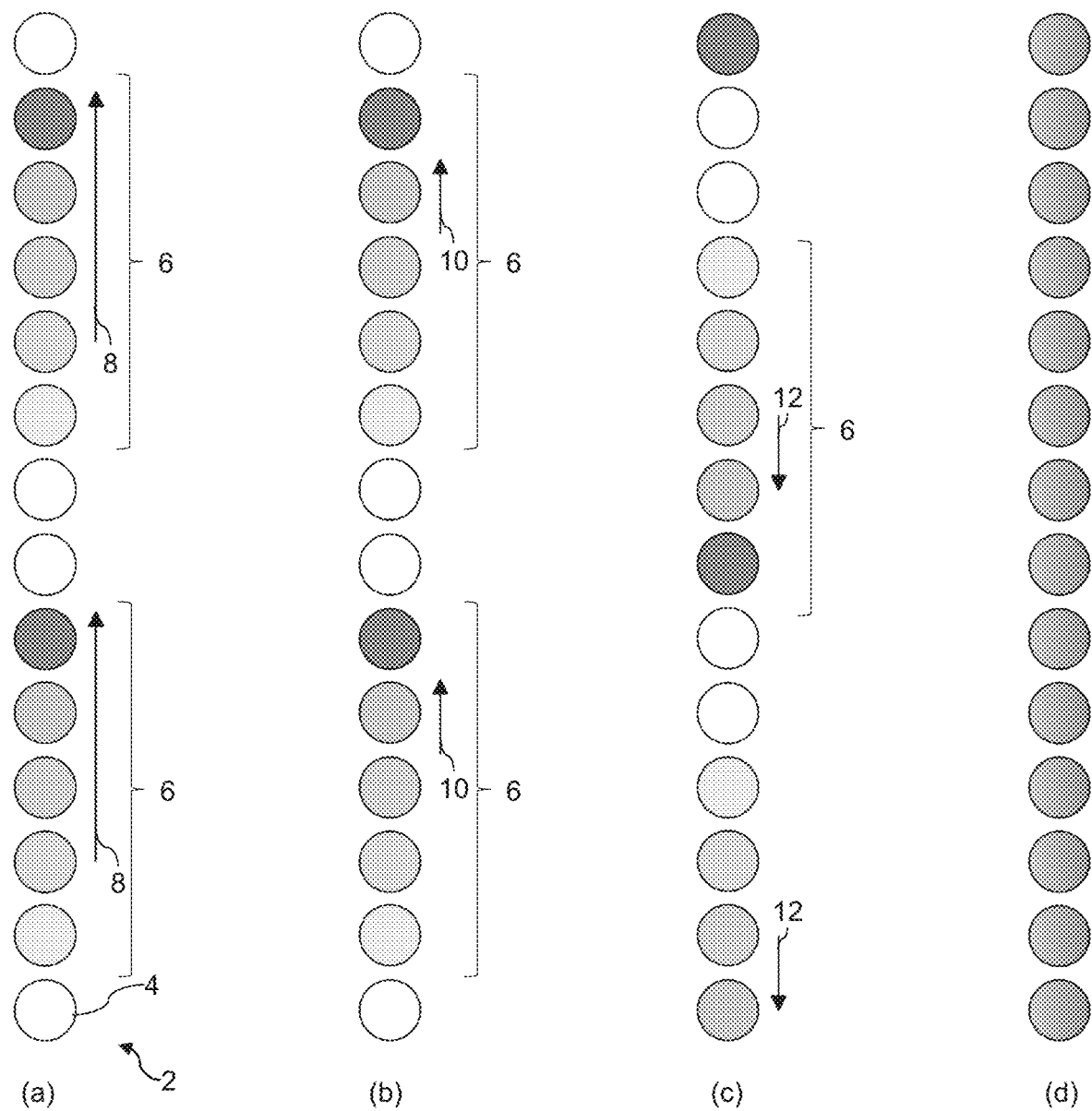
FIG. 4 is a schematic illustration of a first embodiment in accordance with the invention.

In FIG. 4 a first embodiment of the signal generator 2 of the present invention is illustrated schematically. The signal generator 2 comprises fourteen dimmable lights 4 arranged above one another. As long as the vehicle V is not in the predetermined placement region A, the lights 4 produce a chaser light 6. The chaser light is generated by the switching on of five lights 4 arranged next to each other, wherein the light 4 arranged at the front in the running direction of the chaser light 6 shines most intensely and the other four lights 4 of the chaser light 6 shine more weakly stepwise contrary to the running direction of the chaser light 6, so that they quasi form a tail of the front light 4.

As is symbolized by arrows 8, 10 and 12 of different length, the speed of the chaser light 6 is differently high in correspondence with the distance between the vehicle V and the predetermined placement region A.

If the vehicle V is farther away from the placement region A, the chaser light 6 moves relatively quickly, as is illustrated by the arrow 8 (see FIG. 4(a)). If the vehicle V approaches the predetermined placement region A, the chaser light 6 decelerates, as illustrated by the arrow 10 (see FIG. 4(b)). If the vehicle V passes the predetermined placement region A, the chaser light 6 changes direction, as illustrated by the arrow 12 (see FIG. 4(c)). If the vehicle V is in the predetermined placement region A, all four lights 4 shine at the same time (see FIG. 4(d)).

Figure 5:
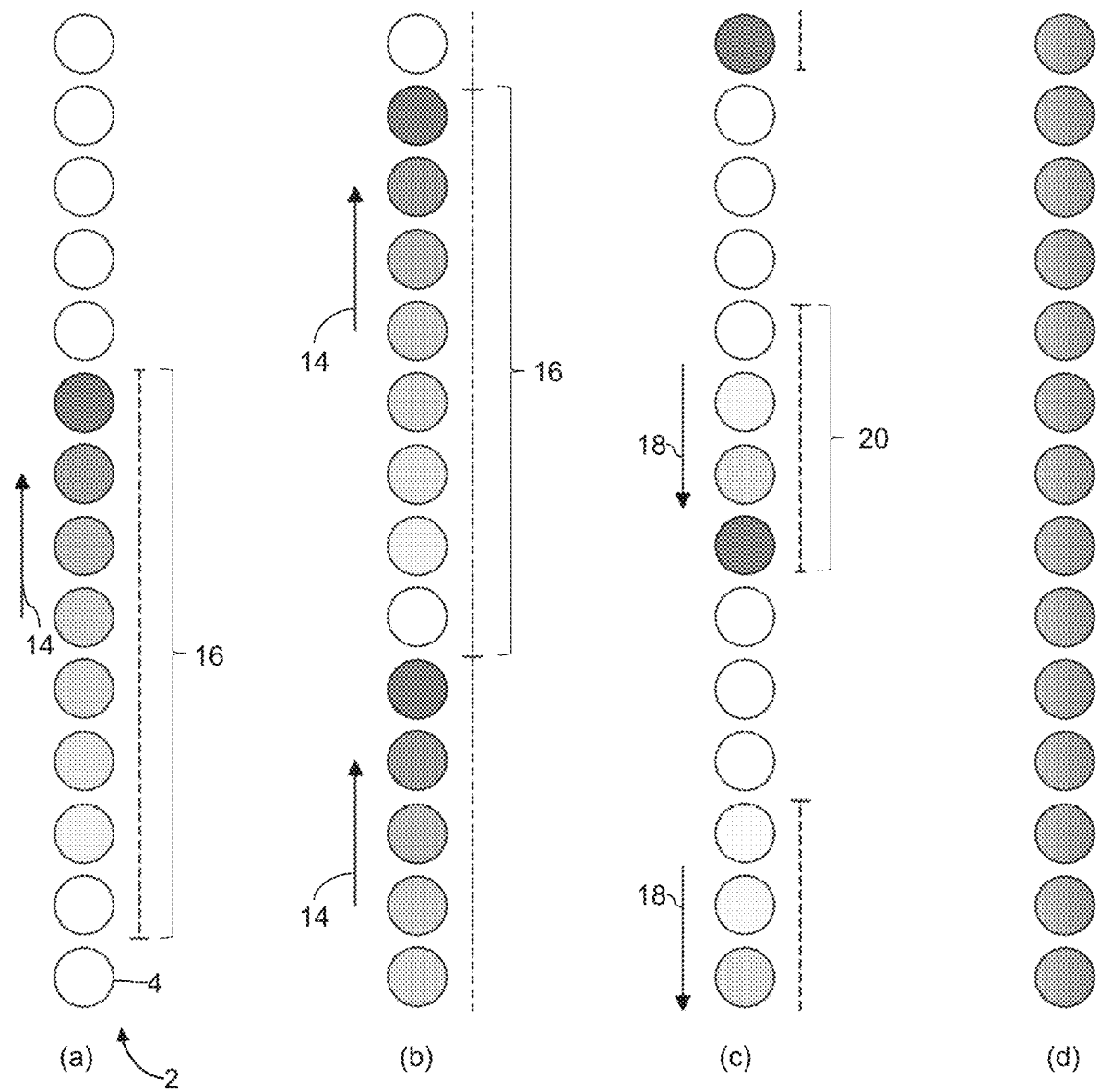
FIG. 5 is a schematic illustration of a second embodiment in accordance with the invention.

FIG. 5 schematically illustrates a second embodiment of the signal generator 2 of the present invention, which differs from the signal generator 2 according to the first embodiment merely with respect to the controlling thereof. Therefore, equal reference signs are used for the structural features.

Like in the first embodiment, the lights 4 generate a chaser light 6 as long as the vehicle V is not in the predetermined placement region A. The chaser light is generated by the switching on of lights 4 arranged next to each other, wherein the light 4 arranged at the front in the running direction of the chaser light 6 shines most intensely and the other lights 4 of the chaser light 6 shine more weakly stepwise contrary to the running direction of the chaser light 6, so that they quasi form a tail of the front light 4. In the second embodiment a decreasing distance between the vehicle V and the predetermined placement region A is displayed by the frequency and the length of the chaser light 6. Like in the first embodiment, the running direction of the chaser light 6 displays the required driving direction.

As illustrated by the arrows 14 and 18, the speed of the chaser light 6 remains constant irrespective of the distance between the vehicle V and the predetermined placement region A and changes its running direction only in the event of passing over the predetermined placement region A (see FIG. 5(c)).

If the vehicle V is farther away from the predetermined placement region A, the chaser light 6 is relatively long, as is illustrated by a bracket 16 (see the eight switched-on lights 4 arranged next to each other in FIG. 5(a)). If the vehicle V approaches the predetermined placement region A, only the frequency is increased first of all and the length of the chaser light 6 is not changed (see FIG. 5(b)). If the vehicle V passes over the predetermined placement region A, the chaser light 6 changes direction, as is illustrated by the arrow 18 (see FIG. 5(c)). Since in the state illustrated in FIG. 5(c) the vehicle V is closer to the predetermined placement region A than in the state illustrated in FIG. 5(b), the length of the chaser light 6 is reduced, as is illustrated by a bracket 20. If the vehicle V is in the predetermined placement region A, all lights 4 shine at the same time (see FIG. 5(d)).

Figure 6:
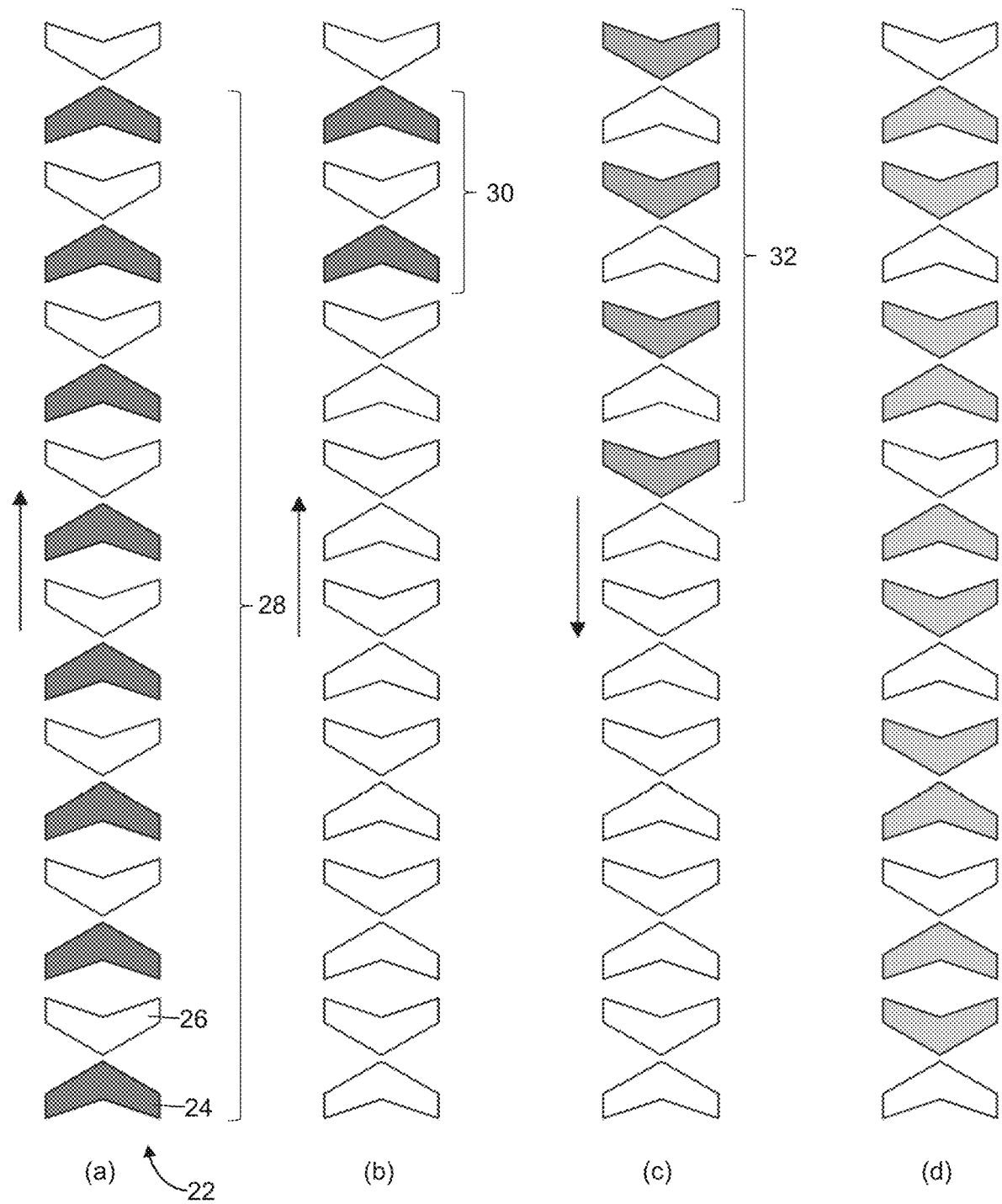
FIG. 6 is a schematic illustration of a third embodiment in accordance with the invention.
Figure 7:
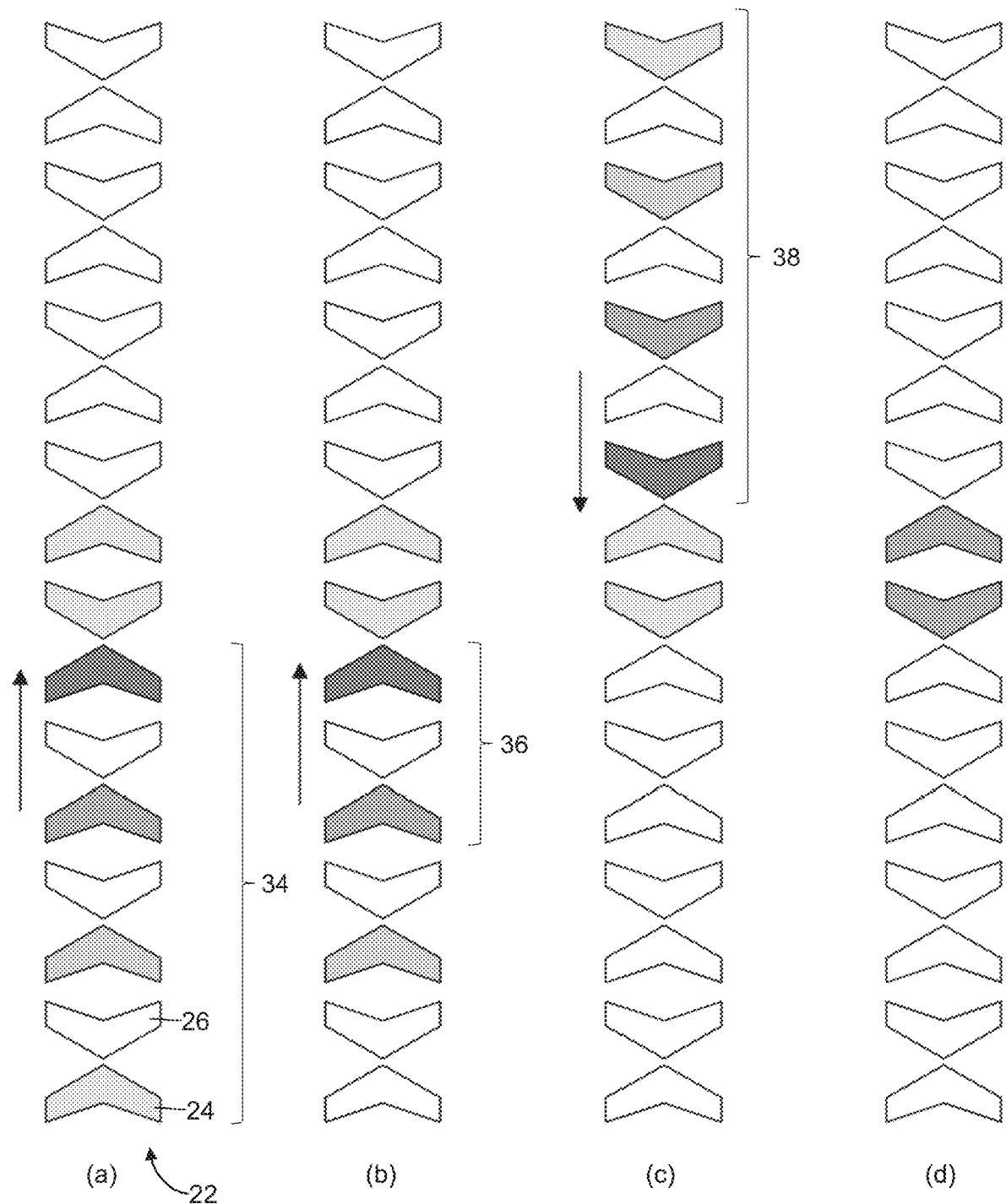
FIG. 7 is a schematic illustration of a fourth embodiment in accordance with the invention.
Figure 8:
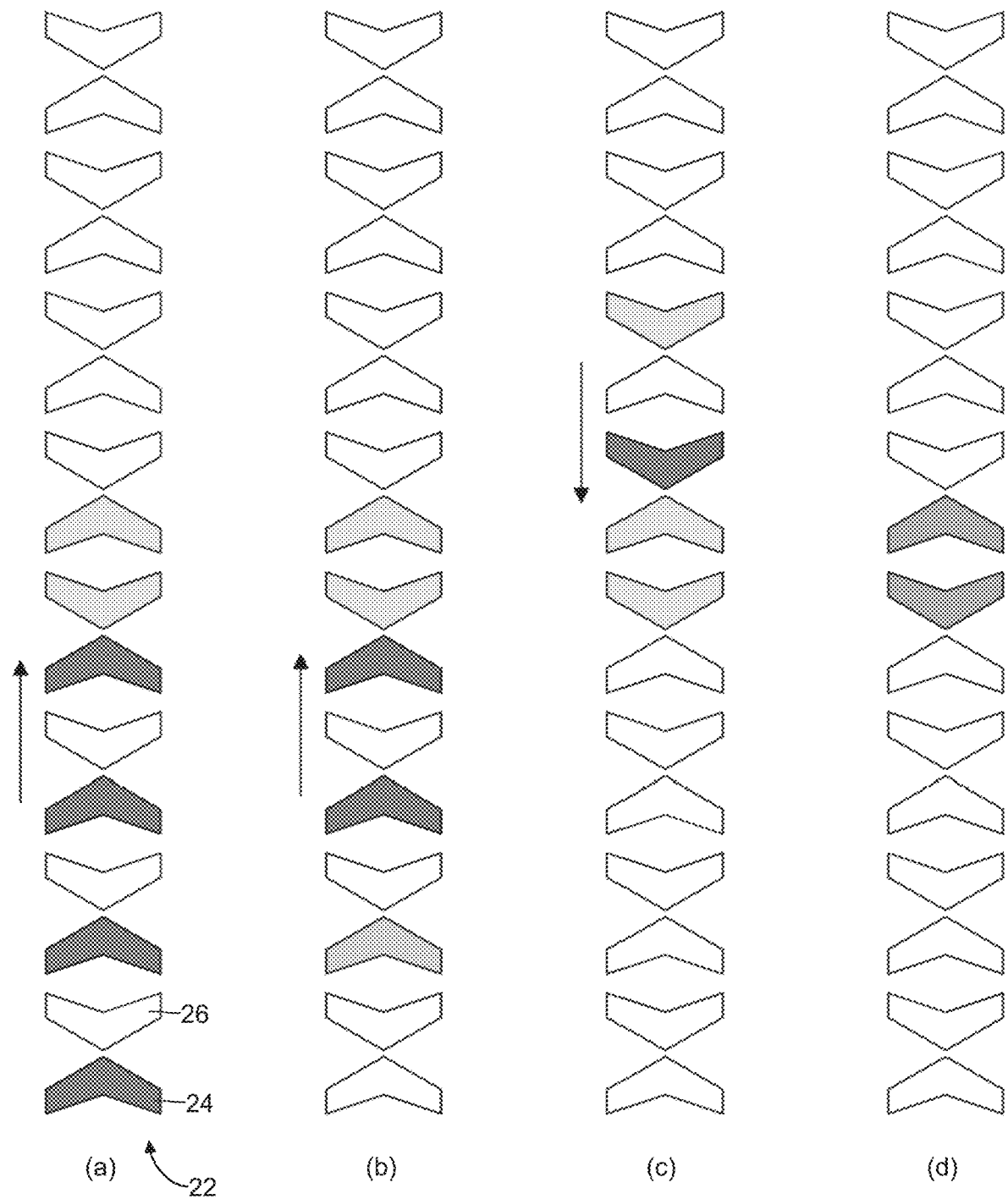
FIG. 8 is a schematic illustration of a fifth embodiment in accordance with the invention.

The embodiments of the signal generator 22 in accordance with the invention illustrated in FIGS. 6, 7 and 8 differ from each other merely in their controlling.

The signal generator 22 comprises eight lights 24 of a first kind and eight lights 26 of a second kind. The lights 24 of the first kind have the shape of arrows pointing upward. The lights 26 of the second kind have the shape of arrows pointing downward. The lights 24 of the first kind and the lights 26 of the second kind are arranged above one another in series and in an interleaved manner. This means that each light 24 of the first kind merely adjoins lights 26 of the second kind and vice versa. The lowermost light is a light 24 of the first kind. The uppermost light is a light 26 of the second kind.

If the signal generator 22 is controlled in accordance with a third embodiment according to the invention, the relative distance of the vehicle V to the predetermined placement region A is visualised by a number of active lamps arranged directly next to each other.

If the vehicle V is farther away from the predetermined placement region A, all lights 24 of the first kind are switched on, as is illustrated by a bracket 28 (see FIG. 6(a)).

If the vehicle V approaches the predetermined placement region A, individual lights 24 of the first kind are switched off in sequence from the bottom (see the reduced number of switched-on lights 24 of the first kind indicated by a bracket 32 in FIG. 6(b)). If the vehicle V passes over the predetermined placement region A, all lights 24 of the first kind are switched off and a number of lights 26 of the second kind which corresponds to the relative distance between the vehicle V and the predetermined placement region A is switched on in sequence from the top (see bracket 32 in FIG. 6(c)). Since in the state illustrated in FIG. 6(c) the vehicle V is closer to the predetermined placement region A than in the state illustrated in FIG. 6(b), the number of switched-on lights 26 of the second kind in the state shown in FIG. 6(c) is lower than the number of switched-on lights 24 of the first kind in the state shown in FIG. 6(b). If the vehicle V is in the predetermined placement region A, pairs of adjacent lights 24, 26 of the first kind and of the second kind will shine (see FIG. 6(d)).

If the signal generator 22 is controlled in accordance with a fourth embodiment in accordance with the invention (see FIG. 7), the relative distance of the vehicle V to the predetermined placement region A is visualised by a length of a chaser light and an arrangement of actively switched lights.

If the vehicle V is farther away from the predetermined placement region A, the lower four lights 24 of the first kind are switched on and off in sequence, each starting at the bottom (see the bracket 34 in FIG. 7(a)). If the vehicle V approaches the predetermined placement region A, the number of the intermittently switched-on lights 24 of the first kind decreases, wherein the lights 24 of the first kind are switched off in sequence starting from the bottom (see the reduced number of switched-on lights 24 of the first kind indicated by a bracket 36 in FIG. 7(b)). If the vehicle V passes over the predetermined placement region A, all the lower four lights 24 of the first kind are switched off and a number of lights 26 of the second kind which corresponds to the relative distance between the vehicle V and the predetermined placement region A is switched on intermittently in sequence from the top (see the bracket 38 in FIG. 7(c)). Since the vehicle V is, in the state illustrated in FIG. 7(c), just as far away from the predetermined placement region A as in the state illustrated in FIG. 7(a), the number of intermittently switched-on lights 26 of the second kind in the state illustrated in FIG. 7(c) is equal to the number of the switched-on lights 24 of the first kind in the state illustrated in FIG. 7(a). If the vehicle V is in the predetermined placement region A, the middle pair of the adjacent lights 24, 26 of the first kind and of the second kind (see FIG. 7(d)) shines more brightly than during the states illustrated in FIGS. 7(a) to 7(c).

The controlling of the signal generator 22 in accordance with a fifth embodiment in accordance with the invention (see FIG. 8) differs from the controlling in accordance with the fourth embodiment merely in that the lights are switched on permanently and not intermittently.

In the third, fourth and fifth embodiments of the invention it is particularly advantageous to use multi-coloured, i.e. colour-variable, lights. Accordingly, the lights in FIGS. 6(d), 7(d) and 8(d) would flash up in red and in FIGS. 6(a) to (c), 7(a) to (c) and 8(a) to (c) in a different colour or in different colours, for instance, in green and/or orange.

The embodiments of the signalling device in accordance with the invention as illustrated in FIGS. 1 and 8 and described above constitute merely five possible implementations of the claimed invention.

The invention claimed is:

1. A vehicle treatment system having a signalling device with
    at least one sensor configured to continuously detect a position of a vehicle approaching the vehicle treatment system in a predetermined approach region in front of or in the vehicle treatment system, and a signal generator which, based on the position of the vehicle, gives instructions for correct driving behavior to a driver of the vehicle, and which comprises at least two lights that include a first light and a second light, the second light arranged above the first light, the signal generator configured to output signals that change continuously or discretely and correspond to a continuously changing position of the vehicle, wherein a speed to be driven is displayed to the driver by a frequency of the signals generated.

2. The vehicle treatment system according to claim 1, wherein the first light is a light of a first kind and the second light is a light of a second kind, wherein the first light is configured to output a signal for/during advancing and the second light is configured to output a signal for/during backing.

3. The vehicle treatment system according to claim 1, wherein the at least two lights comprise at least three lights of the same kind configured to generate at least one chaser light by being switched on and off sequentially.

4. The vehicle treatment system according to claim 3, wherein a direction to be driven and a speed of the vehicle are displayed to the driver by means of a direction of the at least one chaser light and a speed of the at least one chaser light as a function of the position of the vehicle.

5. The vehicle treatment system according to claim 3, wherein a direction to be driven and a speed of the vehicle are displayed to the driver by a direction of the at least one chaser light and a length of the at least one chaser light as a function of the position of the vehicle.

6. The vehicle treatment system according to claim 1, wherein the at least two lights comprise at least three lights of a same kind and a direction to be driven and a speed of the vehicle are displayed to the driver by means of a number of lights of the same kind which are switched actively directly next to each other, said number of lights varying as a function of the position of the vehicle.

7. The vehicle treatment system according to claim 1, wherein the at least two lights comprise at least one dimmable and/or color-variable light.

8. A method for determining and signalling entry information, comprising the steps of:

signalling entry readiness of a vehicle treatment system for a vehicle;

signalling a stop request;

detecting a distance between the vehicle treatment system and the vehicle; and outputting signals corresponding to the distance by a signal generator comprising at least a first light and a second light, the second light arranged above the first light, wherein a speed to be driven by the vehicle is displayed by the frequency of the signals generated.

9. A vehicle treatment system having a signalling device comprising:

at least one sensor configured to continuously detect a position of a vehicle approaching the vehicle treatment system in a predetermined approach region in front of or in the vehicle treatment system; and a signal generator which, based on the position of the vehicle, gives instructions for correct driving behavior to a driver of the vehicle, and which comprises at least two lights that include a first light and a second light, the second light arranged above the first light, the signal generator configured to output signals which change continuously or discretely and correspond to a continuously changing position of the vehicle, wherein a speed to be driven is displayed to the driver by a frequency of the signals generated, wherein the at least two lights comprise at least three lights of a same kind configured to generate at least one chaser light by being switched on and off sequentially, and wherein a direction to be driven and a speed of the vehicle are displayed to the driver by at least one of:

means of a direction of the at least one chaser light and a speed of the at least one chaser light as a function of the position of the vehicle, means of a direction of the at least one chaser light and a length of the at least one chaser light as a function of the position of the vehicle, and means of a number of lights of the same kind which are switched actively directly next to each other, said number of lights varying as a function of the position of the vehicle.

* * * * *